United States Patent
DeBates et al.

(10) Patent No.: US 10,845,864 B2
(45) Date of Patent: Nov. 24, 2020

(54) MULTIPOINT SENSOR SYSTEM FOR EFFICIENT POWER CONSUMPTION

(71) Applicant: Motorola Mobility LLC, Chicago, IL (US)

(72) Inventors: Scott Patrick DeBates, Crystal Lake, IL (US); Vivek Kumar Tyagi, Chicago, IL (US); Sudhir C. Vissa, Bensenville, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 89 days.

(21) Appl. No.: 16/159,330

(22) Filed: Oct. 12, 2018

(65) Prior Publication Data

US 2020/0117264 A1 Apr. 16, 2020

(51) Int. Cl.

| | |
|---|---|
| *G06F 1/3234* | (2019.01) |
| *G05B 15/02* | (2006.01) |
| *H04W 52/02* | (2009.01) |
| *G06F 1/3206* | (2019.01) |
| *G06F 1/3287* | (2019.01) |
| *G06F 1/3212* | (2019.01) |
| *G06F 1/16* | (2006.01) |

(52) U.S. Cl.
CPC ........... *G06F 1/3234* (2013.01); *G05B 15/02* (2013.01); *G06F 1/163* (2013.01); *G06F 1/3206* (2013.01); *G06F 1/3212* (2013.01); *G06F 1/3287* (2013.01); *H04W 52/0212* (2013.01)

(58) Field of Classification Search
CPC ...... G06F 1/3234; G06F 1/3206; G06F 17/10; G06F 11/3089; G06F 11/3093; G06F 1/163; G06F 1/3287; G06F 1/3212; G05B 15/02; H04W 52/0212; H04W 4/04; H04W 4/38; H04W 4/50
See application file for complete search history.

(56) References Cited

U.S. PATENT DOCUMENTS

| | | | | |
|---|---|---|---|---|
| 5,357,141 | A * | 10/1994 | Nitschke | B60R 16/0315 280/735 |
| 7,266,470 | B1 * | 9/2007 | Fulmer | G01D 3/08 340/540 |
| 9,184,987 | B2 * | 11/2015 | Sequeira | H04L 12/12 |
| 2006/0139317 | A1 * | 6/2006 | Leu | G06F 3/011 345/156 |

(Continued)

*Primary Examiner* — Thomas J. Cleary
(74) *Attorney, Agent, or Firm* — SBMC

(57) ABSTRACT

A computing device includes a control system that communicates with multiple sensors that capture data regarding a user. The control system communicates with each of the sensors to obtain information regarding the capabilities of each sensor, and uses this capability information to determine how to configure each of the sensors. The control system also selects one of the multiple sensors to be the master sensor, and the rest of the multiple sensors are slave sensors, and notifies the multiple sensors of whether they are a slave sensor or a master sensor. The master sensor collects sensor data for the multiple sensors, capturing data itself as well as receiving data captured by the slave sensors from the slave sensors. The master sensor sends an indication of the collected data (e.g., the collected data itself or data resulting from processing the collected data) to the control system for analysis and/or processing.

20 Claims, 8 Drawing Sheets

(56) References Cited

U.S. PATENT DOCUMENTS

| | | | | |
|---|---|---|---|---|
| 2007/0109117 | A1* | 5/2007 | Heitzmann | H04L 67/125 340/539.12 |
| 2008/0255641 | A1* | 10/2008 | Ellis | A61F 7/02 607/96 |
| 2011/0087396 | A1* | 4/2011 | Eregen | B60C 23/0461 701/31.4 |
| 2011/0116416 | A1* | 5/2011 | Dobson | H04W 40/20 370/255 |
| 2012/0116696 | A1* | 5/2012 | Wank | G01R 31/42 702/58 |
| 2012/0182160 | A1* | 7/2012 | Hod | G08G 1/0116 340/934 |
| 2013/0163410 | A1* | 6/2013 | Sen | H04W 84/20 370/221 |
| 2017/0090866 | A1* | 3/2017 | Vaughn | G06F 7/02 |
| 2017/0351828 | A1* | 12/2017 | Cronin | H04W 4/70 |
| 2018/0210437 | A1* | 7/2018 | Ashar | G08B 21/0423 |
| 2018/0276980 | A1* | 9/2018 | Yukizane | G08B 17/00 |
| 2018/0357598 | A1* | 12/2018 | Williams | G06K 7/06 |
| 2019/0046037 | A1* | 2/2019 | Ramesh | G16H 40/67 |
| 2019/0219421 | A1* | 7/2019 | Hoffmann | G01D 11/245 |
| 2019/0380583 | A1* | 12/2019 | Danneels | A61B 5/0024 |

* cited by examiner

MULTIPOINT SENSOR SYSTEM FOR EFFICIENT POWER CONSUMPTION

BACKGROUND

As technology has advanced, computing devices have become increasingly mobile. For example, wireless phones, tablets, and headsets (e.g., virtual reality or augmented reality glasses) have become increasingly commonplace. These mobile computing devices can also oftentimes communicate with other devices (e.g., sensors) that the user is wearing. For example, a wristband may provide the number of steps a user has taken to a mobile computing device. All of these devices are powered by batteries, which eventually need recharging or replacing. However, having devices need their batteries recharged or replaced too frequently can lead to user frustration and dissatisfaction with their devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, in a computing device, from each of multiple sensors attached to a user, information describing capabilities of the sensor is received. For each of the multiple sensors, configuration information to configure the sensor is generated based at least in part on the capabilities of the sensor, and for each of two or more of the multiple sensors, the sensor is configured in accordance with the configuration information generated for the sensor. A determination is also made, based at least in part on the capabilities of the two or more of the multiple sensors, of which one of the multiple sensors is to be a master sensor. A notification of this determination is sent to the master sensor and to each of the two or more of the multiple sensors that are not the master sensor. The computing device enters a low power mode while waiting for an indication of sensor data from the master sensor.

In accordance with one or more aspects, in a sensor attached to a user, information describing sensor capabilities of the sensor is sent to a computing device. Configuration information is received from the computing device, and the sensor is configured in accordance with the received configuration information. An indication that the sensor is a master sensor is also received from the computing device. Sensor data captured by one or more slave sensors is received, and the master sensor collects sensor data captured by the master sensor as well as the sensor data captured by the one or more slave sensors. The collected sensor data or a result of processing the collected sensor data is sent to the computing device.

BRIEF DESCRIPTION OF THE DRAWINGS

Embodiments of a multipoint sensor system for efficient power consumption are described with reference to the following drawings. The same numbers are used throughout the drawings to reference like features and components.

DETAILED DESCRIPTION

Figure 1:
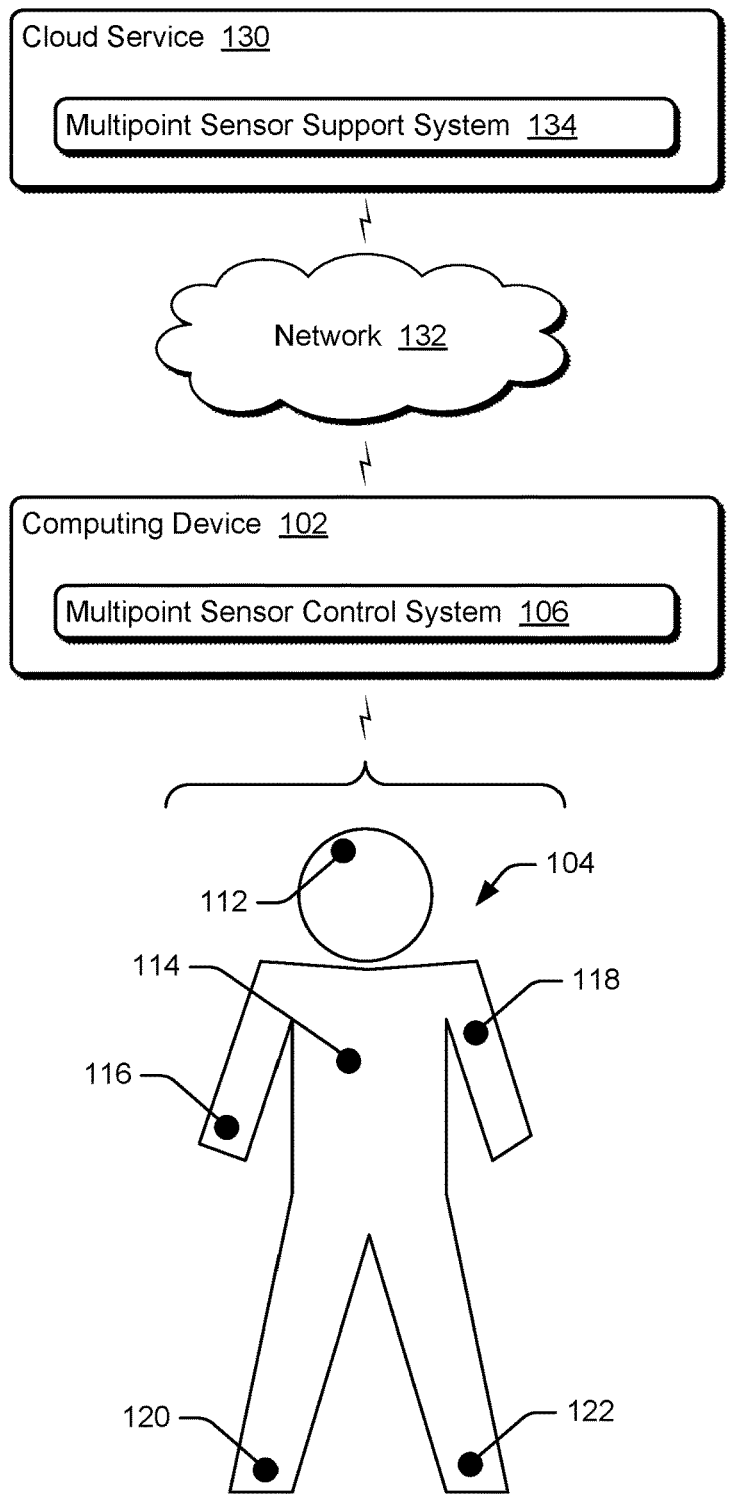
FIG. 1 illustrates an example system implementing the techniques discussed herein.

A multipoint sensor system for efficient power consumption is discussed herein. A computing device includes a multipoint sensor control system that communicates with multiple sensors that are capturing data regarding a user. The computing device is typically a mobile device, such as a wireless phone, AR (augmented reality) or VR (virtual reality) glasses, a watch, and so forth. The multiple sensors are typically sensors attached to the user, such as heart rate sensors, motion sensors, and so forth.

The multipoint sensor control system communicates with each of the sensors to obtain information regarding the capabilities of each sensor. These capabilities can include, for example, the type of sensor (e.g., the type of data the sensor collects), type of battery powering the sensor, charge rate for the battery powering the sensor, algorithms the sensor can run to process collected data, and so forth. The multipoint sensor control system uses this sensor capability information to determine how to configure each of the sensors. This configuration of a sensor can take various forms, such as whether the sensor is to be collecting data (e.g., whether the sensor is enabled), which of multiple power modes the sensor is to operate in, a rate at which data is to be collected by the sensor, an algorithm the sensor is to run to process collected data, and so forth. The specific manner in which different sensors are configured varies based on the intent of an application (the application intent) on the computing device that will be used the data. This application intent can be, for example, communicated to the multipoint sensor control system from the application.

The multipoint sensor control system selects one of the multiple sensors to be the master sensor, and the rest of the multiple sensors are slave sensors. The multipoint sensor control system notifies the multiple sensors of whether they are a slave sensor or a master sensor. Which sensor is the master sensor and which sensors are slave sensors can be determined in a variety of different manners based on the sensor capabilities of the various sensors as well as the application intent.

Generally, the master sensor works as a master or central hub for the multiple sensors, capturing data itself as well as receiving from the slave sensors data captured by the slave sensors. In one or more embodiments, the slave sensors stream data by the slave sensors to the master sensor, which collects and at least temporarily stores the slave sensor data. The master sensor also collects and at least temporarily stores sensor data captured by the master sensor. The master sensor sends all of the collected sensor data (the data received from the slave sensors as well as the data captured by the master sensor) to the mobile device. This allows the mobile device to sleep, then wake up and receive sensor data from a single sensor (the master sensor) that the mobile device will then process.

Additionally or alternatively, the master sensor processes the collected sensor data, such as by running one or more algorithms on the collected sensor data. As part of processing the collected sensor data, the master sensor determines when to send the processed sensor data to the mobile device. For example, the master sensor can process the collected sensor data and determine when the user is moving at faster than a threshold speed (e.g., 4 miles per hour), and send the processed data indicating the current speed of the user to the mobile device. This allows the mobile device to remain in a low power mode (e.g., sleep) and then transition to a higher power mode (e.g., wake up) and receive the results of the one or more algorithms run on the collected data. The master sensor can delay waking the mobile device until particular criteria is satisfied (e.g., a threshold speed is exceeded) indicating the mobile device should be woken up.

In contrast to systems where each of multiple sensors has its own battery and each works independently, the techniques discussed herein provide efficient power consumption by configuring sensors from the multipoint sensor control system based on the application intent and the capabilities of all the sensors. The multipoint sensor control system can determine to put certain sensors in a low power mode in situations in which the application intent is not to use data captured by those certain sensors, thus reducing the power consumption of those certain sensors. Furthermore, a single sensor (the master sensor) is sending collected data to the mobile device rather than each individual sensor, allowing the mobile device to remain in a low power mode longer and reducing power consumption of the mobile device because just one sensor is waking up the mobile device.

FIG. 1 illustrates an example system 100 implementing the techniques discussed herein. The system includes a computing device 102 that can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, an AR headset or device, a VR headset or device), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth. Oftentimes the computing device 102 is a mobile device, which is a device that is designed to be easily portable by a user 104. Examples of such mobile devices include smartphones or other wireless phones, notebook or laptop computers, wearable devices, and so forth.

The computing device 102 includes a multipoint sensor control system 106, which communicates with sensors that capture data regarding the user 104. These sensors can be attached to the user 104, examples of which are sensors 112, 114, 116, 118, 120, and 122. A sensor being attached to the user 104 refers to a sensor that is worn by the user 104 (e.g., as clothing, jewelry, an accessory strapped to the user, etc.) or otherwise on or coupled to the user (e.g., stuck to the user with an adhesive, embedded below the user's skin, etc.). These sensors can be attached to the user 104 at various different parts of his or her body, such as the user's head (sensor 112), the user's chest (sensor 114), the user's arms (sensors 116 and 118), and the user's legs (sensors 120 and 122). It should be noted that one or more of the sensors 112-122 can be implemented in the computing device 102. The multipoint sensor control system 106 communicates with each of the sensors 112-122 to obtain information regarding the capabilities of each sensor. The multipoint sensor control system 106 uses this capability information to determine how to configure each of the sensors 112-122. The multipoint sensor control system 106 also selects one of the sensors 112-122 to be the master sensor, which collects captured sensor data from one or more of the other sensors 112-122 and provides the captured sensor data to the multipoint sensor control system 106 as discussed in more detail below.

In one or more embodiments, the multipoint sensor control system 106 communicates with a cloud service 130 via a network 132. The network 132 can be any of a variety of different networks, including the Internet, a local area network (LAN), a phone network, an intranet, other public and/or proprietary networks, combinations thereof, and so forth. The cloud service 130 can be implemented as any of a variety of different types of computing devices, such as server computers, desktop computers, and so forth.

The cloud service 130 implements a multipoint sensor support system 134 that can perform any of a variety of functionality on behalf of the multipoint sensor control system 106. The multipoint sensor control system 106 can offload various operations onto the multipoint sensor support system 134, which can typically perform the operations faster than the multipoint sensor control system 106 (due to the computing devices used to implement the cloud service 130 being faster than the computing device 102) and/or allow the computing device 102 to consume less power by not having to perform the operations. Which operations are offloaded to the multipoint sensor support system 134 can vary in accordance with the implementation of the multipoint sensor control system 106.

Figure 2:
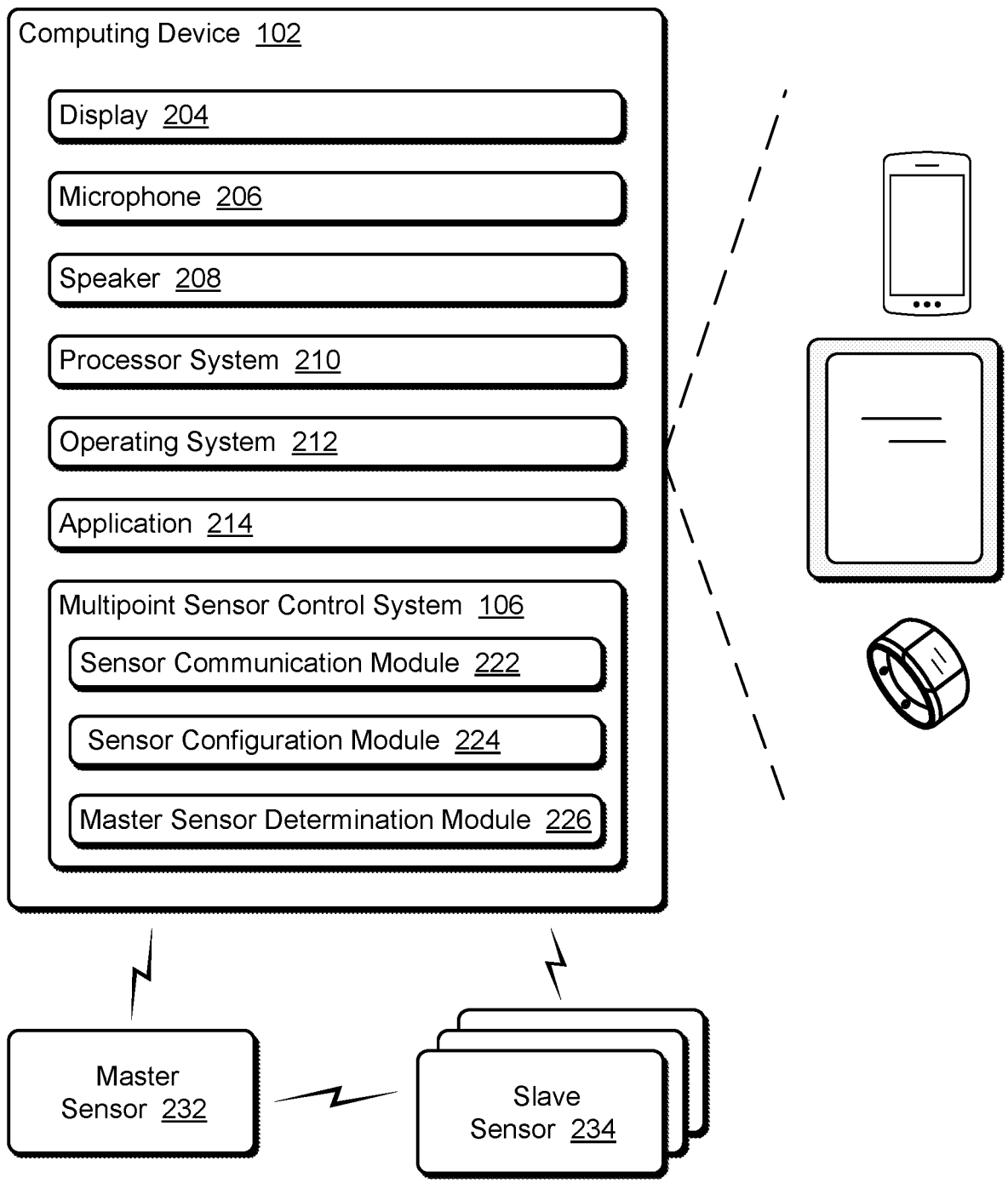
FIG. 2 illustrates an example computing device implementing the techniques discussed herein in additional detail.

FIG. 2 illustrates an example computing device 202 in additional detail. The computing device 102 includes a display 204, a microphone 206, and a speaker 208. The display 204 can be configured as any suitable type of display, such as an organic light-emitting diode (OLED) display, active matrix OLED display, liquid crystal display (LCD), in-plane shifting LCD, projector, and so forth. The microphone 206 can be configured as any suitable type of microphone incorporating a transducer that converts sound into an electrical signal, such as a dynamic microphone, a condenser microphone, a piezoelectric microphone, and so forth. The speaker 208 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 204, the microphone 206, and the speaker 208 can be implemented separately from the computing device 102. In such situations, the computing device 102 can communicate with the display 204, the microphone 206, and/or the speaker 208 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 204 may be separate from the computing device 102 and the computing device 102 (e.g., a streaming media player) communicates with the display 204 via an HDMI cable. By way of another example, the microphone 206 may be separate from the computing device 102 (e.g., the computing device 102 may be a television and the microphone 206 may be implemented in a remote control device) and voice inputs received by the microphone 206 are communicated to the computing device 102 via an IR or radio frequency wireless connection.

The computing device 102 also includes a processor system 210 that includes one or more physical (e.g., hardware) processors, each of which can include one or more cores. The processor system 210 is coupled with, and may implement functionalities of, any other components, modules, or systems of the computing device 102 that are described herein. In one or more embodiments, the processor system 210 includes a single processor having a single core. Alternatively, the processor system 210 includes a single processor having multiple cores and/or multiple processors (each having one or more cores).

The computing device 102 also includes an operating system 212. The operating system 212 manages hardware, software, and firmware resources in the computing device 102. The operating system 212 manages one or more applications 214 running on the computing device 102 and operates as an interface between applications 214 and hardware components of the computing device 102.

The multipoint sensor control system 106 includes a sensor communication module 222, a sensor configuration module 224, and a master sensor determination module 226. The sensor communication module 222 communicates with each of a master sensor 232 and one or more slave sensors 234, to obtain information regarding the capabilities of each sensor, to send configuration information to the sensors 232, 234, and to send indications to the sensors 232, 234 regarding which sensor is the master sensor and which sensor(s) are slave sensors. The sensors 112-122 of FIG. 1 are the sensors 232, 234 of FIG. 2. The sensor configuration module 224 determines the configuration information for the sensors 232, 234 based at least in part on the capabilities of each of the sensors 232, 234. The master sensor determination module 226 determines which sensor is to be the master sensor 232. It should be noted that which sensor is the master sensor can change over time based on the application intent changing, based on changes in the capabilities of the sensors, and so forth. It should also be noted that although sensors 232, 234 are illustrated in FIG. 2 as separate from the computing device 102, additionally or alternatively at least one of the sensors 232, 234 can be implemented in the computing device 102.

The multipoint sensor control system 106 can be implemented in a variety of different manners. For example, the multipoint sensor control system 106 can be implemented as multiple instructions stored on computer-readable storage media and that can be executed by the processor system 210. Additionally or alternatively, the multipoint sensor control system 106 can be implemented at least in part in hardware (e.g., as an application-specific integrated circuit (ASIC), a field-programmable gate array (FPGA), and so forth).

In the illustrated example, the multipoint sensor control system 106 is implemented as a system separate from the application 214. In this example, the application 214 communicates with the multipoint sensor control system 106 to obtain data from the sensors 232, 234. The application 214 also optionally indicates to the multipoint sensor control system 106 what the intent of the application 214 is in having data captured by the sensors 232, 234, allowing the sensor configuration module 224 to determine how to configure the sensors 232, 234 to satisfy the application intent.

Additionally or alternatively, the multipoint sensor control system 106 can be implemented at least in part by the application 214. In this situation, the multipoint sensor control system 106 is part of the application 214 and thus is aware of what the application intent is, allowing the sensor configuration module 224 to determine how to configure the sensors 232, 234.

The sensors 232 and 234 can be any of a variety of different types of sensors, such as user-information sensors, activity sensors, environment sensors, and so forth. User-information sensors refer to sensors that capture data regarding the user himself or herself. Examples of user-information sensors include heart rate sensors that capture data indicating the user's heart rate, temperature sensors that capture data indicating the user's body temperature, electrodes that capture data indicating the electrical activity of the user's heart (e.g., as used in an electrocardiogram), electrodes that capture data regarding the speed and strength of signals between the electrodes (e.g., as used in electromyography), sensors that capture various other biometric data regarding the user, and so forth.

Activity sensors refer to sensors that capture data regarding the motion or movement of the user. Examples of activity sensors include an accelerometer that captures data indicating the acceleration of the user in various dimensions (e.g., x, y, and z dimensions), a gyroscope that captures data indicating the extend and rate of rotation in space (e.g., roll, pitch, and yaw), a magnetometer that captures data indicating angular measurements relative to the Earth's magnetic field, and so forth.

Environment sensors refer to sensors that capture data regarding the environment that the user is in. Examples of environment sensors include temperature sensors that capture data indicating the temperature of the air around the user, humidity sensors that capture data indicating the humidity of the air around the user, light sensors that capture data indicating the amount of light in the room or area in which the user is located, audio sensors that capture data indicating the sound level in the room or area in which the user is located, and so forth.

Sensors 232, 234 can capture data using any of a variety of different public and/or proprietary techniques. The particular manner in which a sensor 232, 234 captures data is dependent on the type and implementation of the sensor. The data captured by a sensor 232, 234 is referred to as sensor data or raw sensor data.

The sensor communication module 222 communicates with each of the sensors 232, 234 to obtain information regarding the capabilities of each sensor, to send configuration information to the sensors 232, 234, and to send indications to the sensors 232, 234 regarding which sensor is the master sensor and which sensor(s) are slave sensors. After the configuration information is sent to the sensors 232, 234, slave sensors 234 send captured sensor data to the master sensor 232, and the sensor communication module 222 receives captured sensor data for the sensors 232, 234 from the master sensor 234. Thus, the sensor communication module 222 does not receive sensor data captured by the slave sensors 234 directly from the slave sensors 234.

The sensor communication module 222 can communicate with the sensors 232, 234 using any of a variety of public and/or proprietary protocols over any of a variety of communication links. These communication links can include any of a variety of different wired communication links and/or wireless communication links. For example, the communication links can include a USB (universal serial bus) communication link, a wireless USB communication link, an infrared communication link, a Bluetooth communication link, a Wi-Fi communication link, and so forth.

In one or more embodiments, the sensor communication module 222 is configured to enter a low power mode (e.g., a sleep mode) until a wake signal is received from the master sensor 232 via a communication link. While in the low power mode the multipoint sensor control system 106 (and the remainder of the computing device 102) can operate in a reduced power state (e.g., lower operating frequency for the processor system 210, one or more processors or cores of the processor system 210 shut down, components such as the display 204 and speaker 208 powered down, etc.) until the wake signal is received from the master sensor 232. In response to the wake signal, the sensor communication module 222 receives sensor data collected by the master sensor 232, as discussed in more detail below.

Each sensor 232, 234 provides information regarding the capabilities of the sensor to the sensor communication module 222. The sensor communication module 222 provides this information to the sensor configuration module 224, which generates configuration information for different ones of the sensors 232, 234 based at least in part on the information regarding the capabilities of the sensors. The information regarding the capabilities of a sensor can be pre-programmed into the sensor (e.g., at the time the sensor is manufactured or during an initialization of the sensor) or otherwise obtained by the sensor. For example, the sensor can access another service, system, or device to obtain the information, the information can be configured by an administrator or user providing settings to the sensor, the information can be obtained by the sensor accessing particular circuitry or algorithms of the sensor (e.g., to determine an amount of energy remaining in a battery of the sensor), and so forth.

The information describing the capabilities of a sensor (also referred to as sensor capabilities) can include a variety of different information, such as power information, processing capacity information, sensor type information, and so forth. Power information refers to information describing how much energy or capacity the power source (e.g., battery) for the sensor has. The power information can include, for example, a current charge state of the power source, an estimated run time for the sensor given the current charge state of the power source, an estimated run time for the sensor when the power source is fully charged, a type of the power source (e.g., whether the battery is rechargeable), a charge rate for the power source, which of multiple power modes the sensor is currently running in (e.g., a low power (e.g., sleep) mode or a high power mode), which of multiple power modes the sensor is capable of running in, and so forth.

Processing capacity information refers to information describing the physical processing capabilities of the sensor. The processing capacity information can include, for example, an identifier of a model of a hardware processor controller of the sensor, an identifier of an amount of physical memory in the sensor, and so forth.

Sensor type information refers to information describing what types of sensor data the sensor captures. The sensor type information can include, for example, an indication that the sensor captures data indicating the user's heart rate, data indicating the electrical activity of the user's heart, data indicating the acceleration of the user in particular dimensions (e.g., x, y, and z dimensions), data indicating the extend and rate of rotation in space (e.g., roll, pitch, and yaw), and so forth.

In some situations, a sensor 232, 234 can be a multisensor device that includes multiple different types of sensors. For example, a device may be worn by the user that captures data indicating the user's heart rate and the user's body temperature. In such situations, the sensor type information indicates which types of sensors the multisensor device includes. The multisensor device can be treated by the multipoint sensor control system 106 as a single sensor. Additionally or alternatively, each of the multiple sensors of the multisensor device can be treated by the multipoint sensor control system 106 as a single sensor.

The sensor configuration module 224 determines the configuration information for the sensors 232, 234 based at least in part on the capabilities of each of the sensors 232, 234 and the application intent. This configuration information can include settings for one or more of the sensors 232, 234 describing what information to capture, can include an indication whether to enable or disable one or more of the sensors 232, 234, a rate at which data is to be captured by a sensor 232, 234, combinations thereof, and so forth. The application intent refers to what the intent is of the application 214 in having data captured by the sensors 232, 234. For example, the application intent may be to have data regarding a run or jog that the user 104 is taking so that the data can be recorded or analyzed, to have data regarding a swim that the user 104 is taking so that the data can be recorded or analyzed, to have data regarding the user's heart rate and body temperature while he or she sleeps recorded or analyzed, and so forth.

In the illustrated example, the application 214 provides to the multipoint sensor control system 106 an indication of what the application intent is, and the multipoint sensor control system 106 determines the configuration information for the sensors 232, 234 based on the application intent. Additionally or alternatively, the multipoint sensor control system 106 can provide the information regarding sensor capabilities for the sensors 232, 234 to the application 214, and the application 214 determines the configuration information for the sensors 232, 234 based on the application intent. The application 214 then provides the configuration information to the multipoint sensor control system 106, and the sensor communication module 222 communicates the configuration information to the sensors 232, 234. In such situations, the application 214 can determine the configuration information for the sensors 232, 234 in any of a variety of different manners analogous to the determination of the configuration information for the sensors 232, 234 by the sensor configuration module 224 discussed herein.

The sensor configuration module 224 can use any of a variety of different rules, criteria, algorithms, and so forth to determine the configuration information for the sensors 232, 234. In one or more embodiments, these various different rules, criteria, and algorithms map application intent to sensor capabilities, allowing a determination to be made as to which sensors (based on their sensor capabilities) are to capture data to satisfy the application intent, a frequency at which sensors are to capture data to satisfy the application intent, and so forth. The particular configuration information will vary based on the sensor capabilities and the application intent.

So, for example, assume that the application intent is to collect and analyze data regarding a jog that the user 104 is taking. In this example, the sensor configuration module 224 can determine that the data from a sensor capturing data regarding distance the user 104 has moved and the data from a sensor capturing heart rate data for the user 104 is desirable. The sensor configuration module 224 determines configuration information for the sensors 232, 234 indicating that one sensor that captures distance data is enabled and one sensor that captures heart rate data is enabled, and the other sensors are disabled (e.g., powered down or put in a low power mode).

Situations can arise in which multiple different sensors can provide the data used to satisfy the application intent. The sensor configuration module 224 can determine which of the multiple sensors to enable to provide the data to satisfy the application intent in a variety of different manners, based on the sensor capabilities. For example, the sensor configuration module 224 can determine to enable the one of the multiple sensors that currently has the highest amount of battery charge remaining, the one of the multiple sensors that has the lowest power drain, and so forth. By way of another example, the sensor configuration module 224 can determine to set configuration information for a sensor indicating a rate at which data is to be captured by the sensor. E.g., if the user 104 is bicycling then the rate at which the application intent indicates distance data should be captured can be lower than if the user were walking (e.g., capture distance data once every ten seconds if bicycling but once every two seconds if walking).

By way of yet another example, the sensor configuration module 224 can determine to enable the one of the multiple sensors that is included in a device that will already be enabled due to the application intent. E.g., if an armband includes both a sensor that captures data regarding the distance the user 104 has moved and the heart rate of the user 104, and multiple other sensors can capture data regarding the distance the user 104 has moved but no other sensors can capture data regarding the heart rate of the user 104, then the sensor configuration module 224 determines to enable the sensor that is in the armband to capture data regarding the distance the user 104 since the armband will already be drawing power to determine the heart rate of the user 104.

Thus, in contrast to systems in which all sensors are enabled at all times and providing data to the multipoint sensor control system 106, the techniques discussed herein allow individual sensors to be configured based at least in part on the sensor capabilities and the application intent. This allows some sensors to be disabled (e.g., powered down), or operated in a lower power mode (e.g., capturing data at a lower rate), thereby reducing power consumption by the sensors.

The master sensor determination module 226 determines which of a set of multiple sensors is to be the master sensor 232, and notifies, via the sensor communication module 222, the set of multiple sensors of this determination. Which of the set of multiple sensors is to be the master sensor 232 at a particular time can vary. For example, one sensor may be the master sensor 232 on one day, and a different sensor may be the master sensor 232 on the following day. In one or more embodiments, the set of multiple sensors is the set of sensors that have been enabled as a result of the configuration determinations made by the sensor configuration module 224. Thus, if a sensor is disabled, then the sensor cannot be the master sensor 232 (although this can change if the sensor is later enabled). Additionally or alternatively, the set of multiple sensors is all of the multiple sensors in communication with the computing device 102 (e.g., any sensor from which the multipoint sensor control system 106 received information describing the capabilities of the sensor). If the master sensor determination module 226 determines that a sensor that was disabled as part of the configuration determinations made by the sensor configuration module 224 is to be the master sensor 232, then that disabled sensor is re-enabled (e.g., by the sensor configuration module 224 or the master sensor determination module 226).

Which sensor is the master sensor 232 is determined as part of a sensor initialization routine, discussed in more detail below. The sensor initialization routine can be performed at various times, such as in response to the computing device 102 being powered on, in response to the computing device 102 being reset, in response to a new sensor being in communication with the computing device 102, in response to a sensor losing communication with the computing device 102, in response to a user or administrator request (e.g., an indication from the user 104 that he or she is going for a jog), in response to a command from the application 214, in response to the application 214 beginning execution, and so forth.

In one or more embodiments, one sensor (e.g., the master sensor 232) is always enabled and capturing data at at least a threshold rate (e.g., at least once every 30 seconds). The data from this one sensor can be used by the application 214 to determine a change in the user and thus a change in intent of the application 214. For example, the data from this one sensor can indicate that the user is moving at a speed associated with jogging rather than sitting, and the application intent can change from capturing heart rate and body temperature while the user sits to capturing heart rate and distance moved during the jog.

The master sensor determination module 226 can determine which sensor is the master sensor 232 in any of a variety of different manners based at least in part on the sensor capabilities. In one or more embodiments, the master sensor determination module 226 determines that the master sensor 232 is the one of the multiple sensors that is expected to use the most power. For example, the master sensor determination module 226 determines that of the sensors enabled as a result of the determination made by the sensor configuration module 224, given the sensor rates of the enabled sensors, the sensor that will be using (e.g., drawing) the most power is the master sensor 232. The amount of power that a sensor will be drawing can be readily determined given the sensor capabilities and the rate at which data is captured by the sensor.

Additionally or alternatively, the master sensor determination module 226 can determine which sensor is the master sensor 232 in a variety of different manners. For example, data may be received from all sensors in communication with the computing device 102 for a test amount of time (e.g., two seconds), and the sensor that detects the most movement (e.g., largest distance of movement, largest frequency of movement, etc.) can be determined to be the master sensor 232. By way of another example, the master sensor determination module 226 can determine that a particular sensor that communicates a request to the multipoint sensor control system 106 to be the master sensor is the master sensor 232. By way of yet another example, the master sensor determination module 226 can determine that a sensor that has sufficient power to satisfy the application intent (e.g., enough remaining power to capture data for a one hour bicycle ride or a five mile jog) and does so most efficiently (e.g., uses the smallest percentage of its total or available power) is the master sensor 232.

In one or more embodiments, the sensor configuration module 224 determines whether a sensor has sufficient power to satisfy the application intent (e.g., enough remaining power to capture data for a one hour bicycle ride or a five mile jog), and if the sensor does not have sufficient power to satisfy the application intent then the sensor is not the master sensor. Additionally or alternatively, the sensor may be the master sensor 232 for a duration of time (e.g., until the sensor runs out of power), and then the master sensor determination module 226 determines a different sensor to be the master sensor 232.

It should be noted that some sensors may not be capable of being the master sensor, such as due to their processing or storage capabilities. An indication of such can be expressly or inherently provided as part of the capabilities of the sensor. In making its determination, the master sensor determination module 226 does not determine as the master sensor 232 a sensor not capable of being the master sensor.

The sensor communication module 222 communicates a notification to the sensor that is determined to be the master sensor that that sensor is the master sensor 232. The sensor communication module 222 also communicates a notification to each sensor that is enabled but not determined to be the master that that sensor is a slave sensor 234. The sensor communication module 222 also notifies the slave sensors 234 of which sensor is the master sensor 232, and/or notifies the master sensor 232 of which sensor(s) are the slave sensors 234. This notification allows each slave sensor 234 to communicate with the master sensor 232 and send sensor data captured by the slave sensor 234 to the master sensor 232. The notification optionally includes information indicating how to communicate between a slave sensor 234 and the master sensor 232, such as a network address or identifier of the master sensor 232, a name or identifier of the master sensor 232 for use with Bluetooth pairing, and so forth.

Generally, the master sensor 232 receives from each slave sensor 234 sensor data captured by that slave sensor 234. The master sensor 232 collects (e.g., stores in a buffer or other storage device) the sensor data received from the slave sensors 234 as well as the sensor data captured by the master sensor 232. The master sensor 232 then sends an indication of the collected sensor data (e.g., the collected sensor data itself or other data generated by the master sensor 232 from the collected sensor data) to the sensor communication module 222, which in turn provides the data to the application 214. The application 214 can then process the indication of the collected sensor data as it desires, such as by storing the indication, changing a user interface or other feedback provided to a user of the computing device 102, and so forth.

In one or more embodiments, the master sensor 232 sends the collected sensor data itself to the sensor communication module 222. This collected data includes the sensor data captured by the master sensor 232 as well as the sensor data captured by and received from the slave sensors 234. The rate at which the master sensor 232 sends the collected data to the sensor communication module 222 can be indicated to the master sensor 232 by the multipoint sensor control system 106 (e.g., as part of notifying the master sensor 232 that it is the master sensor 232). Additionally or alternatively, the rate at which the master sensor 232 sends the collected data to the sensor communication module 222 can be determined in other manners, such as being configured in the master sensor 232, being when certain rules or criteria are satisfied (e.g., at least a threshold amount of data (e.g., 50 individual pieces of data have been captured by the various sensors 232, 234) has been captured by the sensors 232, 234), and so on.

In this situation, the computing device 102 is able to remain in a low power mode, and then resume operation in a higher power mode at the rate at which the master sensor 232 sends the collected data to the sensor communication module 222. Power of the computing device 102 is thus conserved due to the ability to remain in a low power mode until a next designated time that the master sensor 232 is to send the collected data to the sensor communication module 222. The computing device 102 need not remain in a higher power mode to continually receive captured sensor data from all of the sensors 232, 234 individually.

Additionally or alternatively, the indication of the collected sensor data that the master sensor 232 sends to the sensor communication module 222 is data generated by the master sensor 232 processing the collected sensor data. In these situations, the master sensor 232 collects the sensor data captured by the master sensor 232 as well as the sensor data captured by the slave sensors 234. However, rather than just sending the collected sensor data to the sensor communication module 222, the master sensor 232 processes the collected sensor data (e.g., by running one or more algorithms on the collected sensor data) and sends the result of processing the collected sensor data to the sensor communication module 222.

The master sensor 232 can process the manner in a variety of different manners, such as by applying various rules or criteria to the collected sensor data, running an algorithm with the collected sensor data as inputs to the algorithm, and so forth. The manner in which the master sensor 232 is to process the collected sensor data (e.g., the algorithm to run and optionally parameters for the algorithm) is provided to the master sensor 232 by the application 214 via the multipoint sensor control system 106. The result of processing the collected sensor data can take various forms, such as a single value or various other information generated based on the collected sensor data. For example, the result of processing the collected sensor data can be a value indicating a distance moved, a number of steps taken, a rate of speed of movement, and so forth.

The master sensor 232 can send the result of processing the collected sensor data to the sensor communication module 222 at various different intervals. In one or more embodiments, the master sensor 232 sends the result of processing the collected sensor data to the sensor communication module 222 at a specified interval (e.g., every fifteen seconds), as specified by, for example, the application 214 or the master sensor 232. In this situation, the computing device 102 is able to remain in a low power mode, and then resume operation in a higher power mode at the rate at which the master sensor 232 sends the result of processing the collected sensor data to the sensor communication module 222. Furthermore, the computing device 102 is alleviated of the burden of expending power to process the collected sensor data.

Additionally or alternatively, the master sensor 232 sends the result of processing the collected sensor data to the sensor communication module 222 in response to the result of processing the collected sensor data satisfying some criteria, such as a threshold value. For example, the master sensor 232 can process the collected sensor data to determine when the user has taken one step, when the user's heart rate exceeds a threshold heart rate (e.g., 140 beats per second), when the user has moved a threshold distance (e.g., twenty feet), and so forth. In response to the criteria being satisfied, the master sensor 232 sends a wake signal to the computing device 102 to wake the computing device from a low power mode, then sends the result of processing the collected sensor data (e.g., that one step has been taken, the user's current or average heart rate, the distance and/or speed at which the user is moving, etc.).

In this situation, the computing device 102 is able to remain in a low power mode, and then resume operation in a higher power mode in response to the wake signal from the master sensor 232. Power of the computing device 102 is thus conserved due to the ability to remain in a low power mode until receipt of the wake signal from the master sensor 232. The computing device 102 need not remain in a higher power mode to continually receive captured sensor data from all of the sensors 232, 234 individually, and need not expend power to process the collected sensor data.

Figure 3:
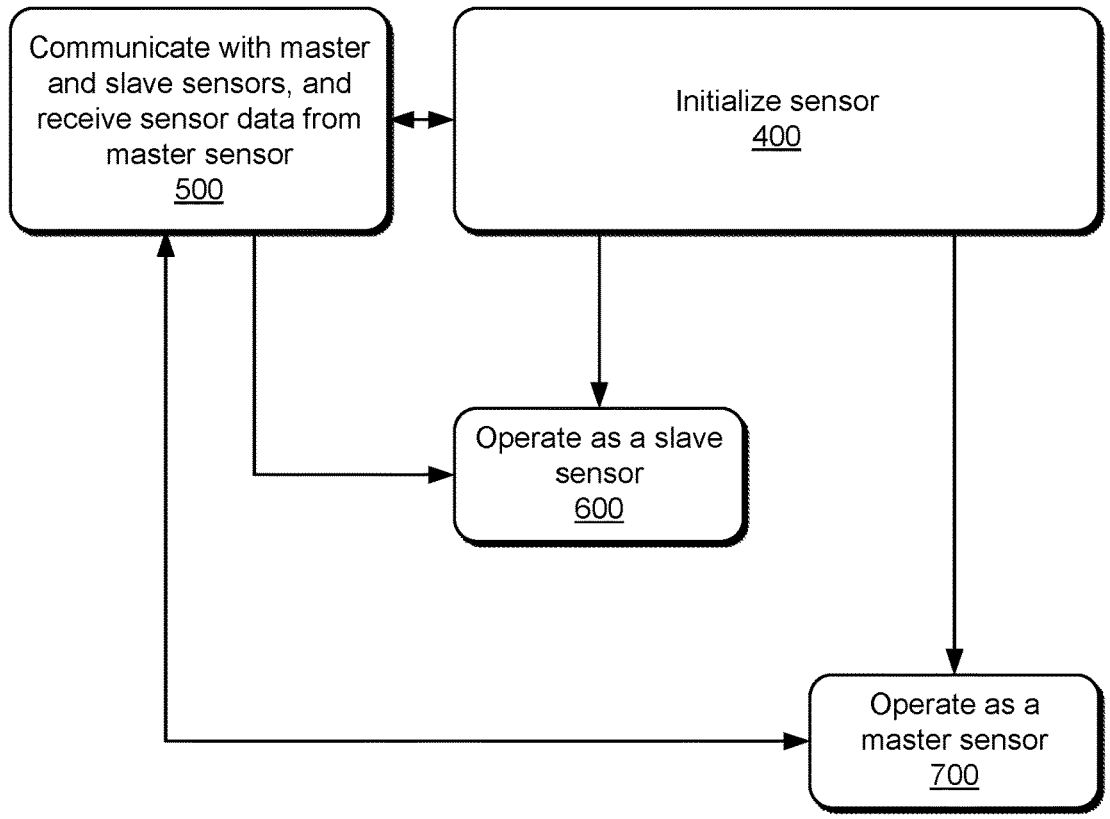
FIGS. 3, 4, 5, 6, and 7 illustrate example processes for implementing the techniques discussed herein in accordance with one or more embodiments.

FIG. 3 illustrates an example process 300 for implementing the techniques discussed herein in accordance with one or more embodiments. Process 300 is carried out by the sensors, such as any of sensors 112-122 of FIG. 1 or any of sensors 232, 234 of FIG. 2, and the multipoint sensor control system and/or an application, such as the multipoint sensor control system 106 of FIG. 1 and FIG. 2 and/or the application 214 of FIG. 2, and can be implemented in software, firmware, hardware, or combinations thereof. Operations shown on the left-hand side of FIG. 3 are performed by the multipoint sensor control system and/or an application, operations shown in the middle of FIG. 3 are performed by the slave sensors, and operations shown on the right-hand side of FIG. 3 are performed by the master sensor. Process 300 is shown as a set of acts and is not limited to the order shown for performing the operations of the various acts.

The sensors are initialized are initialized as part of an example process 400, discussed in more detail below with reference to FIG. 4. These sensors include sensors that will be slave sensors as well as sensors that will be master sensors.

The multipoint sensor control system and/or application communicates with the master and slave sensors, and receives sensor data from the master sensor as part of an example process 500, discussed in more detail below with reference to FIG. 5. This includes providing configuration information to the sensors, notifying the sensors whether they are slave or master sensors, and receiving sensor data from the master sensor.

The slave sensors proceed to operate as slave sensors as part of an example process 600, discussed in more detail below with reference to FIG. 6. The master sensor proceeds to operate as a master sensor as part of an example process 700, discussed in more detail below with reference to FIG. 7.

Figure 4:
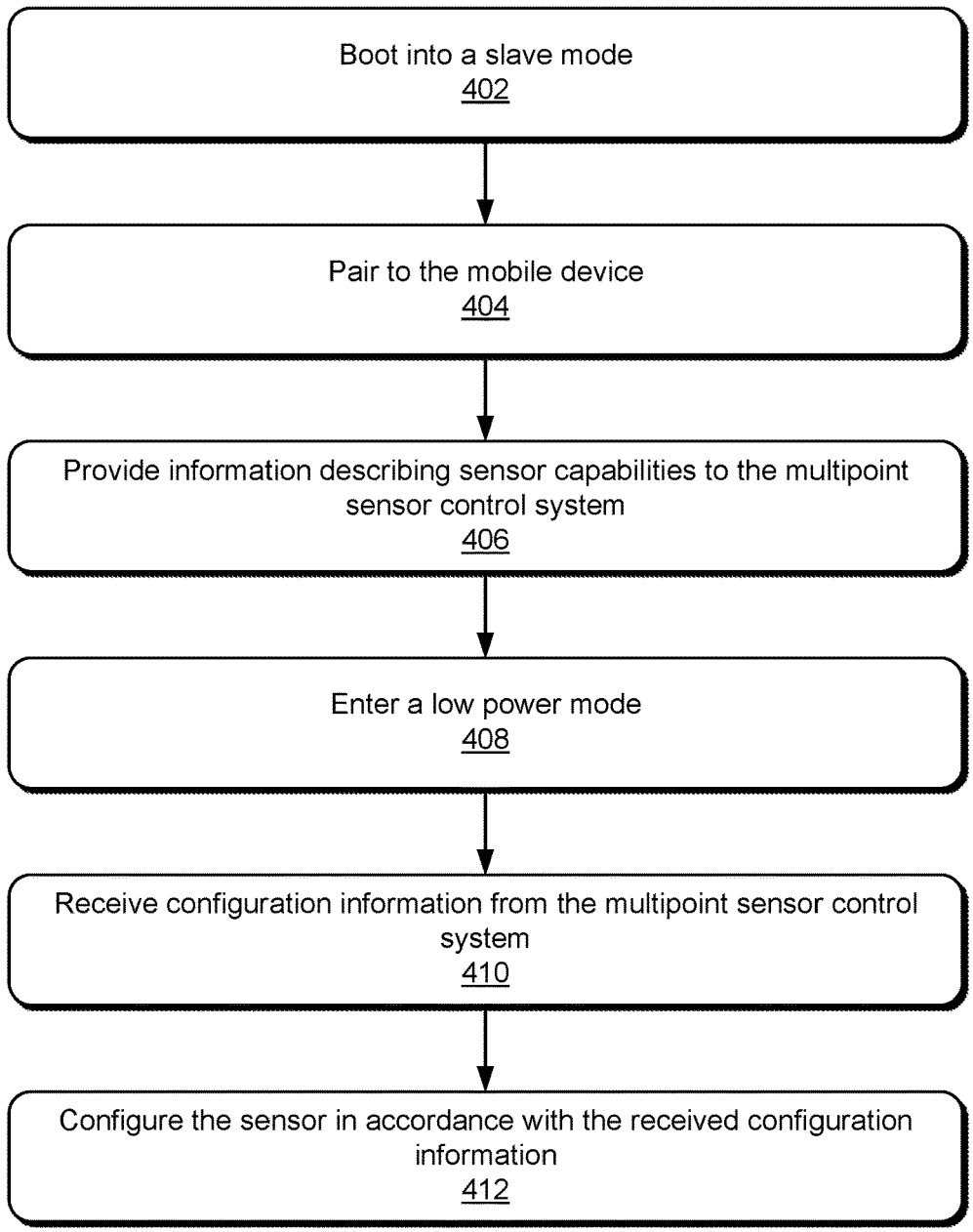

FIG. 4 illustrates an example process 400 for implementing the techniques discussed herein in accordance with one or more embodiments. Process 400 describes initializing multiple sensors to operate in accordance with the techniques discussed herein. Process 400 is carried out by a sensor, such as any of sensors 112-122 of FIG. 1 or any of sensors 232, 234 of FIG. 2, and can be implemented in software, firmware, hardware, or combinations thereof. Process 400 is shown as a set of acts and is not limited to the order shown for performing the operations of the various acts.

In process 400, the sensor is booted into a slave mode (act 402). The slave mode indicates to the sensor that the sensor is a slave sensor rather than a master sensor.

The sensor is paired to the mobile device (404). Pairing the sensor to the mobile device refers to establishing a communication link between the mobile device and the sensor. The communication link can be established in a variety of different manners based on the type of communication link, such as by performing Bluetooth pairing, broadcasting a name or identifier of the mobile device, and so forth. It should be noted that in some situations pairing the sensor to the mobile device includes receiving some user input at one or both of the sensor and the mobile device.

Information describing the capabilities of the sensor is provided to the multipoint sensor control system (act 406). This information describing the capabilities of the sensor can include a variety of different information as discussed above, such as power information, processing capacity information, sensor type information, and so forth.

The sensor then enters a low power mode (act 408). Eventually, the sensor receives configuration information from the multipoint sensor control system (act 410). In response to the received configuration information, the sensor exits the low power mode and enters a higher power mode, and configures itself in accordance with the received configuration information (act 412). This configuration information is generated based on sensor capabilities of the sensor as well as the application intent, as discussed above.

It should be noted that in some situations if the sensor is to be disabled, the sensor remains in the lower power mode. In such situations, the configuration information indicating that the sensor is disabled need not be received by the sensor. Rather, the sensor can enter the low power mode in act 408 and not exit the low power mode because the configuration information is not sent to the sensor in act 410.

Figure 5:
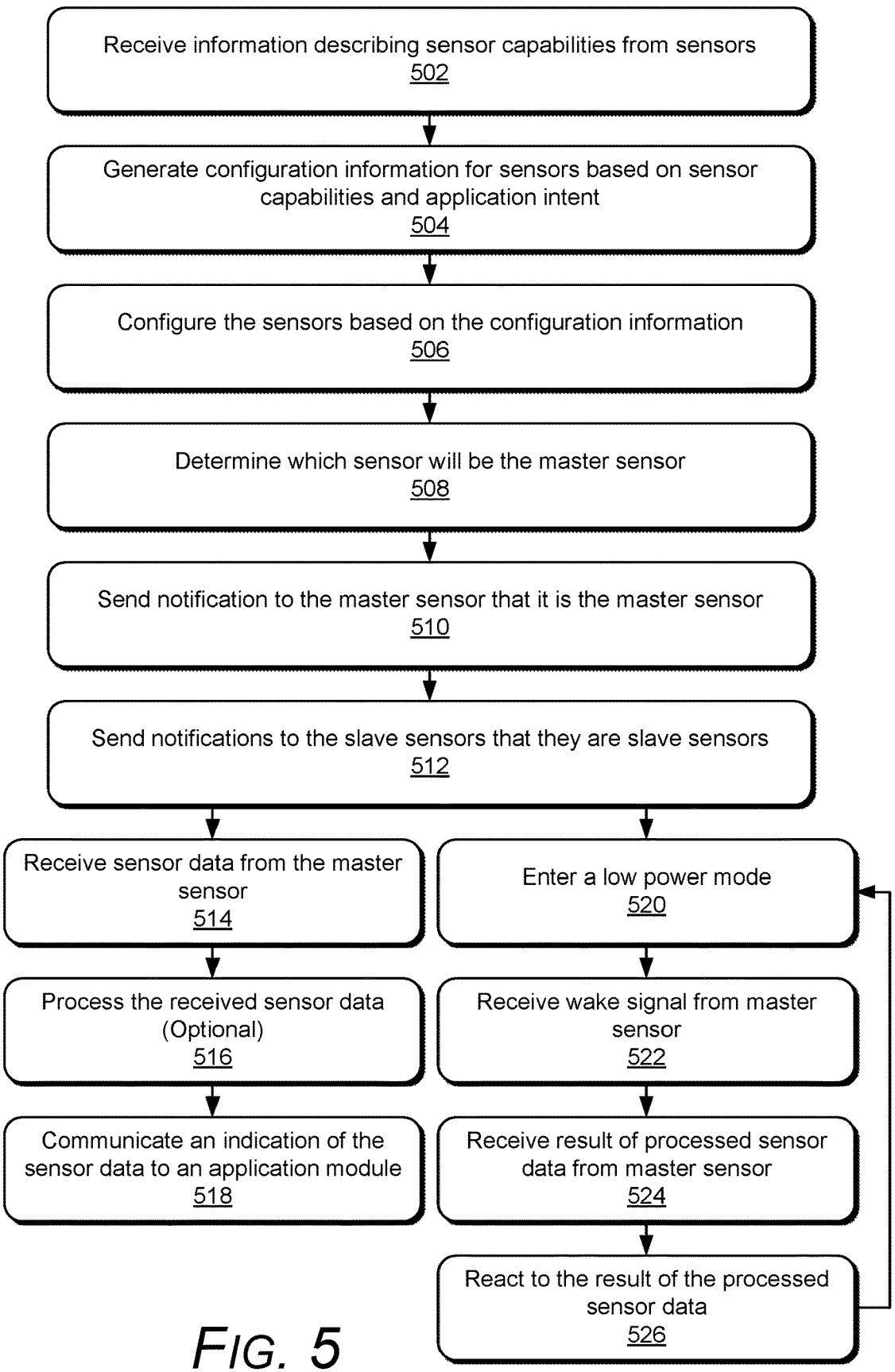

FIG. 5 illustrates another example process 500 for implementing the techniques discussed herein in accordance with one or more embodiments. Process 500 describes operation of a computing device with a multipoint sensor control system, such as computing device 102 of FIG. 1 and FIG. 2. Process 500 is carried out by the multipoint sensor control system and/or an application, such as the multipoint sensor control system 106 of FIG. 1 and FIG. 2 and/or the application 214 of FIG. 2, and can be implemented in software, firmware, hardware, or combinations thereof. Process 500 is shown as a set of acts and is not limited to the order shown for performing the operations of the various acts.

In process 500, information describing the capabilities of the various sensors is received from the sensors (act 502). This information describing the capabilities of the sensor can include a variety of different information as discussed above, such as power information, processing capacity information, sensor type information, and so forth.

Configuration information for the sensors is generated based on the sensor capabilities as well as the application intent (act 504). The configuration information for a sensor can take various forms, such as an indication of what information the sensor is to capture, an indication of whether to enable or disable the sensor, a rate at which data is to be captured by the sensor, combinations thereof, and so forth.

The sensors are configured based on the configuration information (act 506). This configuring of the sensors includes, for example, sending the configuration information to the sensors. Different configuration information can be sent to different sensors. In some situations, such as when a sensor is to be disabled, the configuration information need not be sent to the sensor (rather, the sensor remains in a low power mode as discussed above).

A determination is made as to which sensor will be the master sensor (act 508). Which sensor is the master sensor can be determined in any of a variety of different manners based at least in part on the sensor capabilities of the sensors, discussed above.

A notification is sent to the master sensor that it is the master sensor (act 510). This notification can optionally include additional information, such as identifiers of the other sensors that are slave sensors.

Notifications are also sent to the slave sensors that they are slave sensors (act 512). These notifications can optionally include additional information, such as an identifier of the master sensor.

Process 500 then proceeds in one of two different manners.

In one or more embodiments, sensor data from the master sensor is received (act 514). This received sensor data is sensor data collected by the master sensor, and includes data captured by the master sensor as well as data captured by the slave sensors. The computing device can optionally be in a low power mode while waiting for the received sensor data from the master sensor, and can exit the low power mode at the time at which the computing device expects to receive the sensor data from the master sensor.

The received sensor data is optionally processed (act 516). The received sensor data can be processed in various different manners based on the application intent, such as to determine whether a particular gesture or movement (e.g., a step) was detected, to generate some result data (e.g., a speed of movement, a distance moved, an average heart rate) based on the received sensor data, and so forth. In some situations, at least some of this processing of the received sensor data can be offloaded to a remote device (e.g., a cloud service).

An indication of the sensor data is communicated to an application module (act 518). This application module can be, for example, a module of the application 214 of FIG. 2. The indication of the sensor data can take various forms, such as the sensor data itself, the result data generated from processing the sensor data in act 516, and so forth. The application is then able to analyze, display, store, etc. the indication of the sensor data as the application desires.

Returning to act 512, in one or more embodiments the computing device enters a low power mode (act 520). The computing device remains in the low power mode until receiving a wake signal from the master sensor (act 522). The master sensor processes the collected sensor data as discussed above, allowing the computing device to remain in the low power mode until the master sensor determines that the computing device is to be woken up (e.g., as a result of the result of the processing of the collected sensor data satisfying a threshold value or other criteria).

The computing device receives the result of the processed sensor data from the master sensor (act 524) and reacts to the result of the processed sensor data (act 526). This reaction can take various forms, such as provide the result of the processed sensor data to an application module for storage, provide the result of the processed sensor data to an application module for display or other presentation of the result, and so forth.

The computing device then returns to act 520, entering a low power mode until a wake signal is again received from the master sensor.

Figure 6:
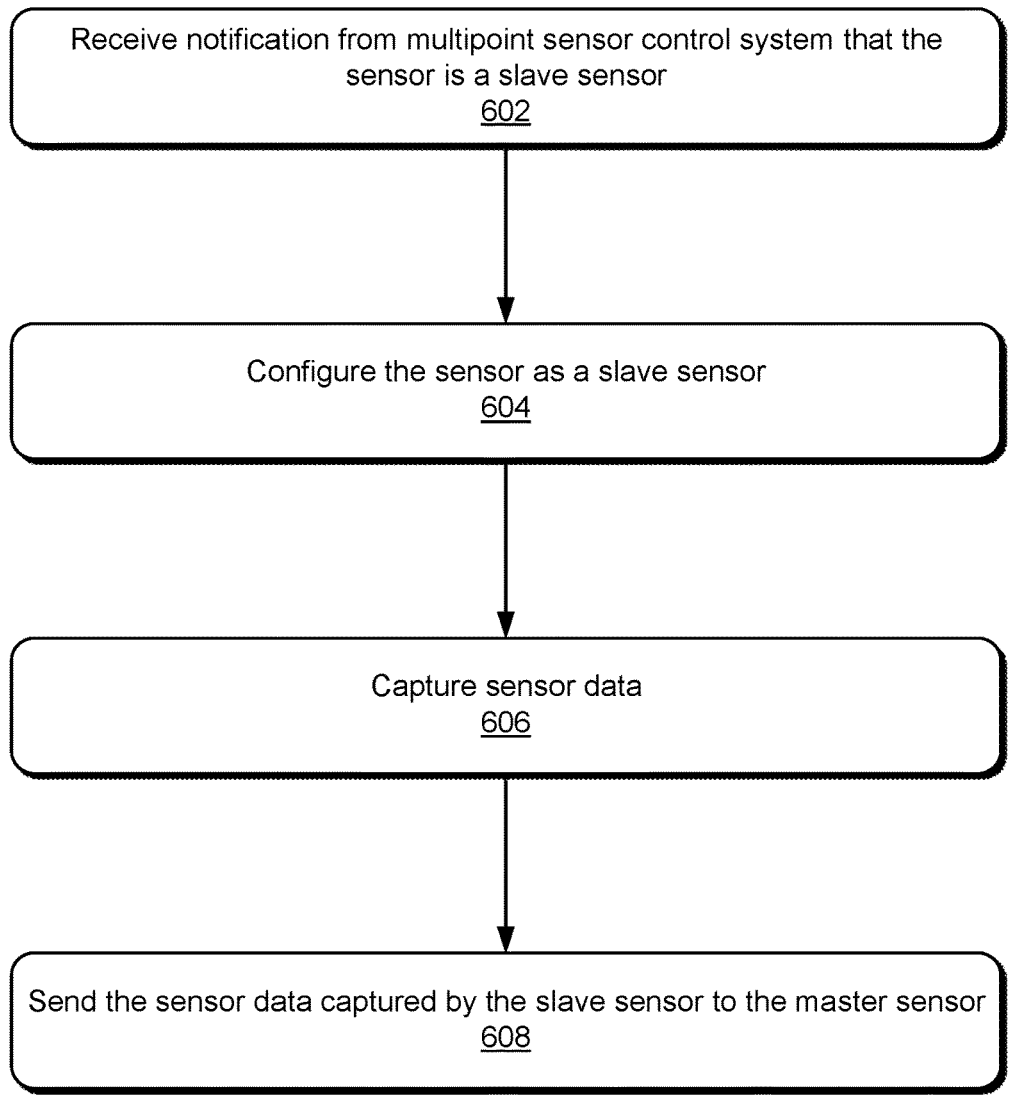

FIG. 6 illustrates another example process 600 for implementing the techniques discussed herein in accordance with one or more embodiments. Process 600 describes operation of a slave sensor, such as a slave sensor 234 of FIG. 2. Process 600 is carried out by the slave sensor, and can be implemented in software, firmware, hardware, or combinations thereof. Process 600 is shown as a set of acts and is not limited to the order shown for performing the operations of the various acts.

In process 600, notification is received from the multipoint sensor control system that the sensor is a slave sensor (act 602). This notification can optionally include additional information, such as an identifier of the master sensor.

The sensor configures itself as a slave sensor (act 604). This configuration includes, for example, establishing a communication link between the slave sensor and the master sensor.

The sensor proceeds to capture sensor data (act 606). This capturing of sensor data is in accordance with the configuration information received from the multipoint sensor control system, as discussed above.

The sensor sends the sensor data it captures to the master sensor (act 608). The captured sensor data can be sent to the master sensor in different manners, such as streamed to the master sensor (e.g., sent to the master sensor as soon as the data is capture), held and sent to the master sensor in batches (e.g., five pieces of captured sensor data at a time), and so forth.

Figure 7:
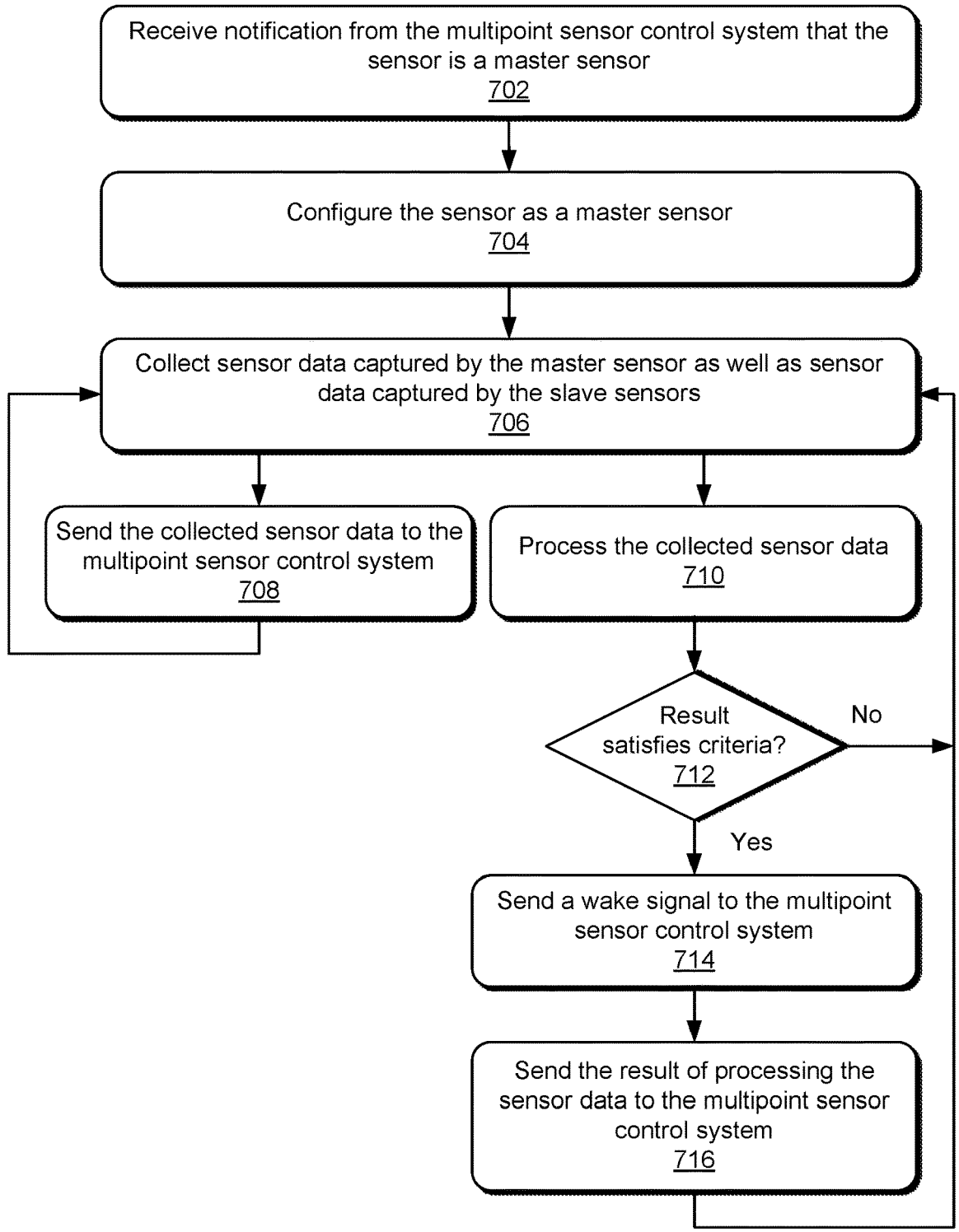

FIG. 7 illustrates another example process 700 for implementing the techniques discussed herein in accordance with one or more embodiments. Process 700 describes operation of a master sensor, such as master sensor 232 of FIG. 2. Process 700 is carried out by the master sensor, and can be implemented in software, firmware, hardware, or combinations thereof. Process 700 is shown as a set of acts and is not limited to the order shown for performing the operations of the various acts.

In process 700, notification is received from the multipoint sensor control system that the sensor is the master sensor (act 702). This notification can optionally include additional information, such as identifiers of the slave sensors.

The sensor configures itself as a master sensor (act 704). This configuration includes, for example, establishing a communication link between the master sensor and each of the slave sensors.

Sensor data is collected and stored at least temporarily (act 706). The sensor data collected includes both sensor data captured by the master sensor and sensor data received from (and captured by) the slave sensors.

Process 700 then proceeds in one of two different manners.

In one or more embodiments, the collected sensor data is sent to the multipoint sensor control system (act 708). In this situation, the master sensor need not (and typically does not) process the collected sensor data. The master sensor then continues to receive and process the collected data (acts 708, 710).

Additionally or alternatively, the master sensor processes the collected sensor data (act 710). The collected sensor data can be processed in various different manners based on the application intent, such as to determine whether a particular gesture or movement (e.g., a step) was detected, to generate some result data (e.g., a speed of movement, a distance moved, an average heart rate) based on the received sensor data, and so forth.

A check is made as to whether the result of processing the collected sensor data satisfies particular criteria (at 712). The criteria (e.g., as provided to the master sensor by the multipoint sensor control system) being satisfied refers to, for example, the result of processing the collected sensor data satisfying (e.g., exceeding) a threshold value as discussed above. For example, the criteria may be satisfied if the result of processing the collected sensor data indicates that the user has moved one step.

If the result does not satisfy the criteria, then the master sensor continues to receive and process the collected data (acts 706, 710). However, if the result does satisfy the criteria, the master sensor sends a wake signal to the multipoint sensor control system (act 714), then sends the result of processing the sensor data to the multipoint sensor control system (act 716). The master sensor then continues to receive and process the collected data (acts 706, 710).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 8:
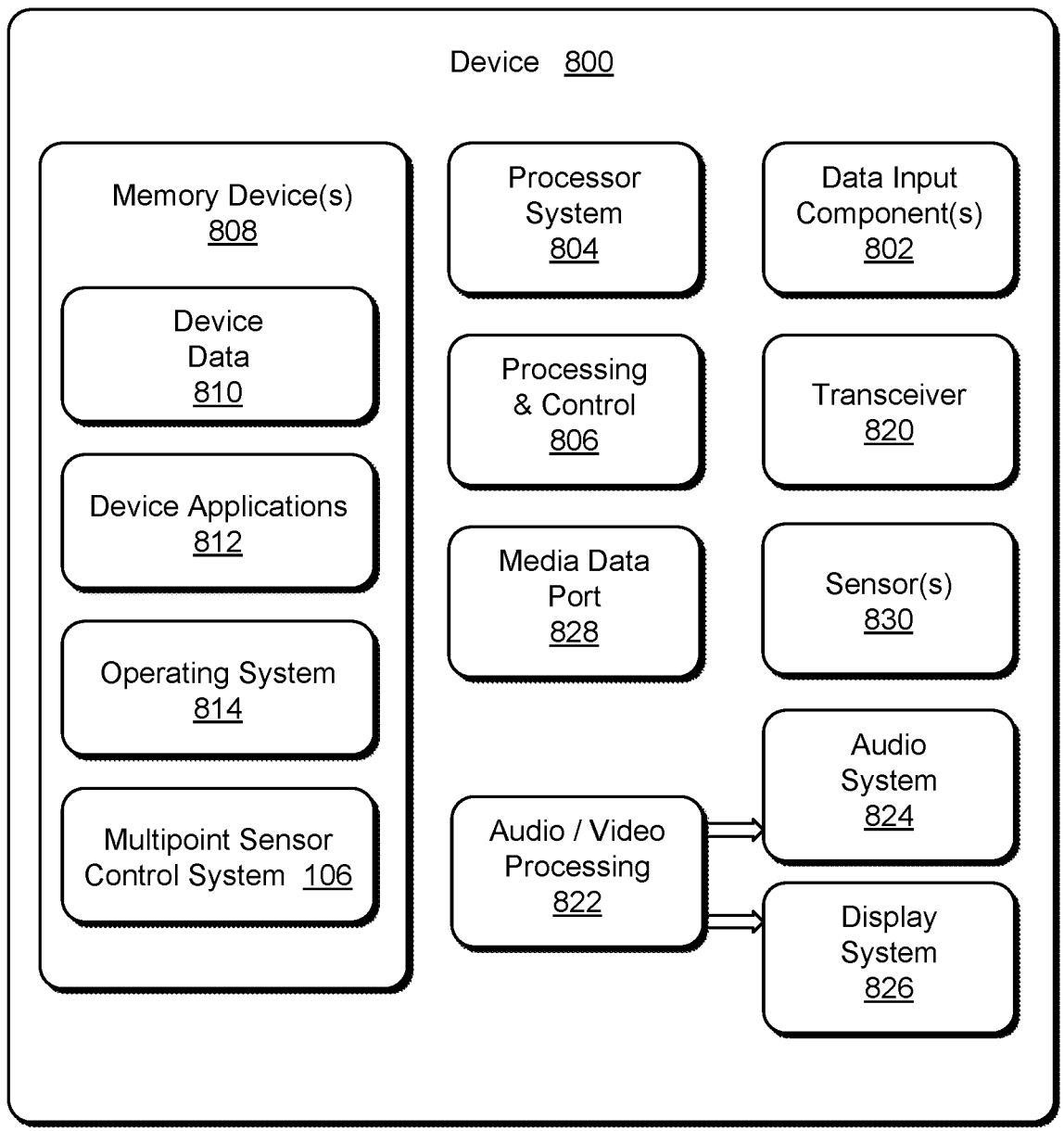
FIG. 8 illustrates various components of an example electronic device that can implement embodiments of the techniques discussed herein.

FIG. 8 illustrates various components of an example electronic device 800 that can be implemented as a computing device as described with reference to any of the previous FIGS. 1-7. The device 800 may be implemented as any one or combination of a fixed or mobile device in any form of a consumer, computer, portable, user, communication, phone, navigation, gaming, messaging, Web browsing, paging, media playback, or other type of electronic device.

The electronic device 800 can include one or more data input components 802 via which any type of data, media content, or inputs can be received such as user-selectable inputs, messages, music, television content, recorded video content, and any other type of audio, video, or image data received from any content or data source. The data input components 802 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 802 may also include various other input components such as microphones, touch sensors, keyboards, and so forth.

The electronic device 800 of this example includes a processor system 804 (e.g., any of microprocessors, controllers, and the like) or a processor and memory system (e.g., implemented in a system on a chip), which processes computer executable instructions to control operation of the device 800. A processor system 804 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 800 can be implemented with any one or combination of software, hardware, firmware, or fixed logic circuitry implemented in connection with processing and control circuits that are generally identified at 806. Although not shown, the electronic device 800 can include a system bus or data transfer system that couples the various components within the device 800. A system bus can include any one or combination of different bus structures such as a memory bus or memory controller, a peripheral bus, a universal serial bus, or a processor or local bus that utilizes any of a variety of bus architectures.

The electronic device 800 also includes one or more memory devices 808 that enable data storage such as random access memory, nonvolatile memory (e.g., read only memory, flash memory, erasable programmable read only memory, electrically erasable programmable read only memory, etc.), and a disk storage device. A memory device 808 provides data storage mechanisms to store the device data 810, other types of information or data (e.g., data backed up from other devices), and various device applications 812 (e.g., software applications). For example, an operating system 814 can be maintained as software instructions with a memory device and executed by the processor system 804.

In one or more embodiments the electronic device 800 includes a multipoint sensor control system 106, described above. Although represented as a software implementation, the multipoint sensor control system 106 may be implemented as any form of a control application, software application, signal processing and control module, firmware that is installed on the device 800, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 808.

The electronic device 800 also includes a transceiver 820 that supports wireless and/or wired communication with other devices or services allowing data and control information to be sent as well as received by the device 800. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 800 can also include an audio or video processing system 822 that processes audio data or passes through the audio and video data to an audio system 824 or to a display system 826. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 828. In implementations the audio system or the display system are external components to the electronic device. Alternatively or in addition, the display system can be an integrated component of the example electronic device, such as part of an integrated touch interface.

In one or more embodiments, the electronic device includes one or more sensors 830. The sensor(s) 830 can be a master sensor (e.g., master sensor 232 of FIG. 2) or a slave sensor (e.g., a slave sensor 234 of FIG. 2). The sensor(s) 830 can be any of a variety of different types of sensors as discussed above with reference to sensors 232, 234 of FIG. 2 as well as sensors 112-122 of FIG. 1. For example, the sensor(s) 830 can be user-information sensors, activity sensors, environment sensors, and so forth.

Although embodiments of techniques for a multipoint sensor system for efficient power consumption have been described in language specific to features or methods, the subject of the appended claims is not necessarily limited to the specific features or methods described. Rather, the specific features and methods are disclosed as example implementations of techniques for implementing a multipoint sensor system for efficient power consumption.

What is claimed is:

1. A method implemented in a computing device, the method comprising:
   receiving, for each of multiple sensors attached to a user, information describing capabilities of the sensor, the information including information describing a type of data the sensor collects;
   generating, for each of the multiple sensors, configuration information to configure the sensor based at least in part on the capabilities of the sensor, the configuration information including an indication of what data the sensor is to capture;
   configuring, for each of the multiple sensors, the sensor in accordance with the configuration information generated for the sensor;
   determining, based at least in part on the capabilities of the multiple sensors, which one of the multiple sensors is to be a master sensor and which one or more of the multiple sensors are to be slave sensors;
   sending, to the one of the multiple sensors that is to be the master sensor, a notification that the one of the multiple sensors is the master sensor;
   sending, to each of the one or more of the multiple sensors that are to be slave sensors, a notification that the sensor is a slave sensor including an identification of the master sensor to which the slave sensor is to send captured sensor data; and
   entering a low power mode while waiting for an indication of sensor data from the master sensor.

2. The method as recited in claim 1, further comprising:
   receiving a wake signal from the master sensor;
   receiving from the master sensor a result of the master sensor having processed sensor data collected by the master sensor, the sensor data collected by the master sensor including sensor data captured by the master sensor as well as sensor data captured by each of the slave sensors; and
   reacting to the result of the processed sensor data.

3. The method as recited in claim 2, the reacting to the result of the processed sensor data comprising communicating the result of the processed sensor data to an application on the computing device.

4. The method as recited in claim 1, the generating further comprising generating the configuration information based at least in part on an application intent of an application on the computing device.

5. The method as recited in claim 4, the information describing capabilities of the sensor including power information indicating an estimated run time for the sensor given a current charge state of a power source of the sensor, and the determining comprising determining, as the master sensor, one of the multiple sensors having sufficient power to satisfy the application intent of the application.

6. The method as recited in claim 1, the multiple sensors comprising sensors for which the configuration information indicates the sensor is enabled.

7. The method as recited in claim 1, the determining comprising determining as the master sensor the one of the multiple sensors that is expected to use the most power.

8. The method as recited in claim 1, the configuration information further including a rate at which the data is to be captured by the sensor.

9. The method as recited in claim 1, the multiple sensors comprising at least one type of sensor selected from the group of: user-information sensors, activity sensors, and environment sensors.

10. The method as recited in claim 1, the information describing capabilities of the sensor including one or more algorithms the sensor can run to process data captured by the sensor.

11. A computing device comprising:
   a processor; and
   a computer-readable storage medium having stored thereon multiple instructions that, responsive to execution by the processor, cause the processor to perform acts including:
      receiving, for each of multiple sensors attached to a user, information describing capabilities of the sensor, the information including information describing a type of data the sensor collects;
      generating, for each of the multiple sensors, configuration information to configure the sensor based at least in part on the capabilities of the sensor, the configuration information including an indication of what data the sensor is to capture;
      configuring, for each of the multiple sensors, the sensor in accordance with the configuration information generated for the sensor;
      determining, based at least in part on the capabilities of the multiple sensors, which one of the multiple sensors is to be a master sensor and which one or more of the multiple sensors are to be slave sensors;
      sending, to the one of the multiple sensors that is to be the master sensor, a notification that the one of the multiple sensors is the master sensor;
      sending, to each of the one or more of the multiple sensors that are not the master sensor, a notification that the sensor is a slave sensor including an identification of the master sensor to which the slave sensor is to send captured sensor data; and
      entering a low power mode while waiting for an indication of sensor data from the master sensor.

12. The computing device as recited in claim 11, the acts further including:
   receiving sensor data from the master sensor, the received sensor data including sensor data captured by the master sensor as well as sensor data captured by each of the slave sensors;
   processing the received sensor data; and
   communicating an indication of the processed sensor data to an application module.

13. The computing device as recited in computing device as recited in claim 11, the acts further including:
   receiving a wake signal from the master sensor;
   receiving from the master sensor a result of the master sensor having processed sensor data collected by the master sensor, the sensor data collected by the master sensor including sensor data captured by the master sensor as well as sensor data captured by each of the slave sensors; and
   reacting to the result of the processed sensor data.

14. The computing device as recited in claim 13, the reacting to the result of the processed sensor data comprising communicating the result of the processed sensor data to an application on the computing device.

15. The computing device as recited in claim 11, the generating further comprising generating the configuration information based at least in part on an application intent of an application on the computing device.

16. The computing device as recited in claim 11, the configuration information for at least one of the multiple sensors indicating that the at least one of the multiple sensors is to operate in a low power mode.

17. A method implemented in a sensor, the method comprising:
- sending, to a computing device, information describing sensor capabilities of the sensor, the sensor being attached to a user, the information including information describing a type of data the sensor collects;
- receiving configuration information from the computing device, the configuration information including an indication of what data the sensor is to capture;
- configuring the sensor in accordance with the received configuration information;
- receiving, from the computing device, an indication that the sensor is a master sensor;
- receiving sensor data captured by one or more slave sensors;
- collecting sensor data captured by the master sensor as well as the sensor data captured by the one or more slave sensors; and
- sending the collected sensor data or a result of processing the collected sensor data to the computing device.

18. The method as recited in claim 17, the sending the collected sensor data further comprising sending, at an interval specified by and received from the computing device, the collected sensor data to the computing device.

19. The method as recited in claim 17, the sending the result of processing the collected sensor data further comprising:
- processing the collected sensor data;
- determining when a result of processing the collected sensor data satisfies one or more criteria;
- sending, in response to the result of processing the collected sensor data satisfying the one or more criteria, a wake signal to the computing device; and
- sending the result of processing the collected sensor data to the computing device.

20. The method as recited in claim 19, the processing the collected sensor data comprising processing the collected sensor data using an algorithm specified by the computing device.

* * * * *